United States Patent [19]
Silberman et al.

[11] Patent Number: 5,671,567
[45] Date of Patent: Sep. 30, 1997

[54] SUPPORT FACILITY

[75] Inventors: Cyril J. Silberman, Minnetonka; David E. Carlson, Coon Rapids; Michael P. Crelly, Plymouth; Gary M. Hassebroek, Coon Rapids; Mark A. McCorkell, Eden Prairie; C. Andrew Cheng, New Brighton; Richard H. Eide, Minneapolis, all of Minn.

[73] Assignee: Uni-Systems, Inc., Minneapolis, Minn.

[21] Appl. No.: 210,719

[22] Filed: Mar. 18, 1994

[51] Int. Cl.⁶ .................. B66B 9/16; B66F 5/00
[52] U.S. Cl. .................. 52/29; 52/64; 187/205; 254/89 R
[58] Field of Search .................. 52/29, 64, 174; 254/418, 423, 427, DIG. 9, 7 C, 85, 89 R; 187/205, 215, 272, 340, 341

[56] References Cited

U.S. PATENT DOCUMENTS

| | | | |
|---|---|---|---|
| 2,894,892 | 4/1959 | Estel, Jr. .................. | 187/205 |
| 3,831,713 | 8/1974 | Clarke .................. | 187/205 X |

FOREIGN PATENT DOCUMENTS

| | | | |
|---|---|---|---|
| 1397404 | 5/1988 | U.S.S.R. .................. | 187/215 |

Primary Examiner—Wynn E. Wood
Assistant Examiner—Timothy B. Kang
Attorney, Agent, or Firm—Woodcock, Washburn, Kurtz, Mackiewicz & Norris LLP

[57] ABSTRACT

An improved facility for supporting the main landing gear assembly and the nose wheel assembly of a commercial jetliner is quickly adjustable so as to be able to accommodate different aircraft models. The facility includes a nose wheel lift platform system that includes an elongated pit, a support platform that is supported in the pit and is adapted to support an aircraft's nose wheel assembly, and a number of spacer blocks for covering portions of the elongated pit that are not covered by the support platform. The support platform is mounted on a trolley which is equipped to move the support platform up or down as well as lengthwise along the pit. The spacer blocks are slidable along the upper opening of the pit. By moving the trolley beneath a spacer block and engaging the spacer block with the support platform, an operator can move the spacer blocks with the support platform. Accordingly, an operator wishing to reposition the support platform to accommodate a certain type of aircraft may quickly and conveniently reposition the spacer blocks to expose the intended new location of the support platform, and cover the position that was left exposed, prior to moving the support platform to its new location.

9 Claims, 11 Drawing Sheets

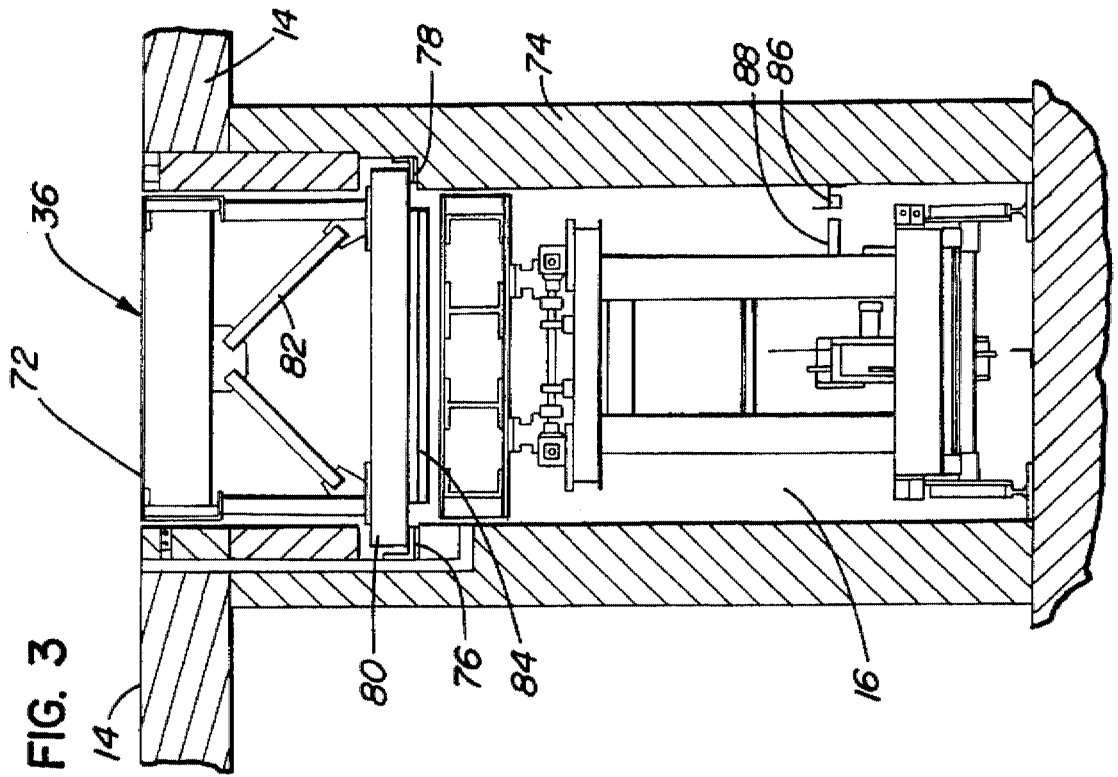
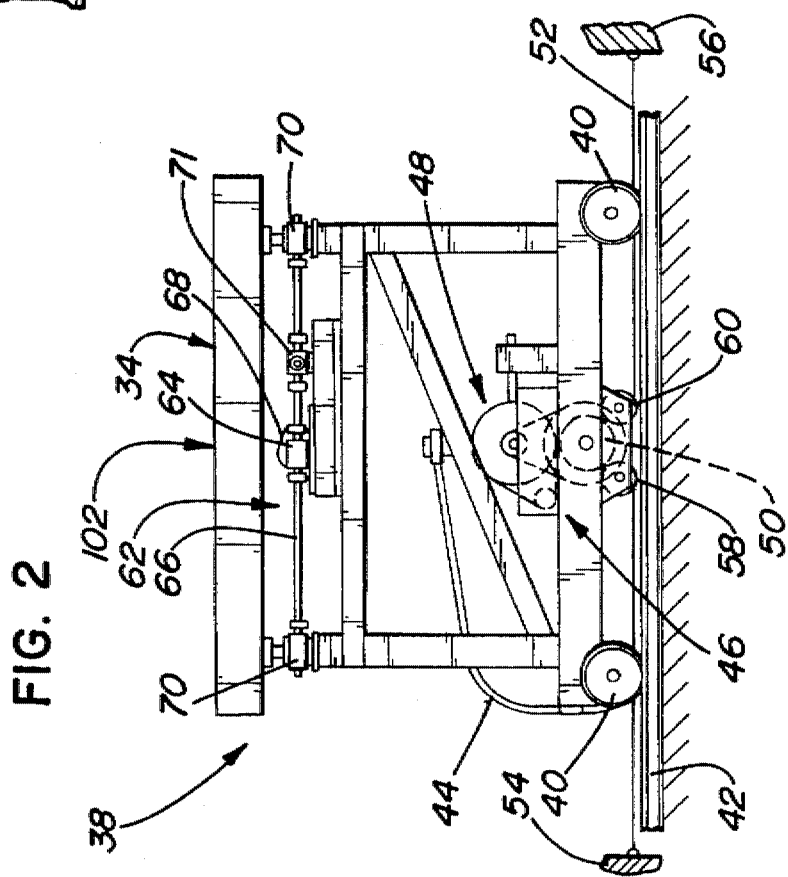

SUPPORT FACILITY

BACKGROUND OF THE INVENTION

1. Field of the Invention

This invention relates to maintenance systems for large aircraft such as commercial jetliners. More specifically, this invention relates to an improved lift platform system for supporting a nose wheel assembly of such an aircraft, which is quickly and conveniently adjustable to accommodate different aircraft models.

2. Description of the Prior Art

Commercial aviation is an intensely competitive endeavor, in which airlines and cargo carriers alike must constantly strive for improved efficiency to prosper.

At any one time, an organization that operates a fleet of aircraft must plan on a certain percentage of its aircraft to be unavailable while regular maintenance and repair is performed. The faster such maintenance is performed, the lower the percentage of aircraft that will be out of service. Increasingly, such organizations are turning to integrated aircraft docking systems of the type that are designed by the assignee of this invention, Uni-Systems, Inc. Uni-Systems' docking systems permit maintenance personnel fast access to almost any portion of an aircraft, and dock and de-dock with an aircraft within a matter of minutes. With such systems, a fleet of aircraft can be maintained more thoroughly, in less time, than was heretofore thought possible.

In the past, maintenance hangars have been equipped with lift platforms for raising and lowering the main landing gear and nose landing gear of an aircraft while its weight is supported by independent jackstands. Lowering the landing and nose gears of the aircraft while it is supported by the jackstands removes the aircraft load from the gears so that they may be serviced or disassembled. A secondary benefit of these lift platforms is that by raising and lowering the platforms, the vertical level, pitch and roll orientations of the aircraft can be adjusted to match the aircraft to non-adjustable maintenance platforms.

Since the spacing between the main landing gear and the nose gear differs from one aircraft model to another, nose gear lift platforms have been designed to move longitudinally toward and away from the main landing gear lift platform. One way that this has been done is to mount the nose gear lift platform on a trolley that is designed to move to and fro in an elongated pit that is defined in the hangar floor. For safety and convenience, a number of spacer decks are laid over the open areas of the pit that are not occupied by the trolley and lift platform. Although workable, such systems require much time and effort to reconfigure for another aircraft. First, the spacer decks must be removed from their positions over the pit by using an overhead crane or forklift truck. Then, the trolley and lift platform are moved to their intended position. Lastly, the spacer decks are positioned over the new open areas of the pit by the overhead crane or forklift truck. It is estimated that this process takes three workers about thirty to sixty minutes to complete.

It is clear that there exists a need for an improved adjustable nose lift platform assembly for an aircraft maintenance system that is designed to be reconfigured more quickly and conveniently than systems that are presently in use.

SUMMARY OF THE INVENTION

Accordingly, it is an object of the invention to provide an improved adjustable nose lift platform assembly for an aircraft maintenance system that is designed to be reconfigured more quickly and conveniently than systems that are presently in use.

An adjustable facility for supporting a nose wheel assembly of a large aircraft during maintenance and repair, includes, according to a first aspect of the invention, a hangar having a floor; an elongated pit defined in the floor, the pit having a width, a length and an opening where the pit intersects the floor; a trolley assembly positioned in the pit, the trolley assembly including structure for moving the trolley assembly lengthwise within the pit, a support platform that is large enough to support a nose wheel assembly of a large aircraft and structure for raising and lowering the support platform; a plurality of spacer blocks positioned versus the pit so as to cover portions of the opening that are not covered by the support platform, the spacer blocks being movable lengthwise of the pit; and engaging structure connected to the trolley assembly for engaging at least one of the spacer blocks, whereby the trolley assembly can be used to reposition the spacer blocks along the opening when the position of the support platform is to be changed.

According to a second aspect of the invention, an improved facility for performing maintenance and repair on large aircraft such as a commercial jetliner includes a hangar, the hangar having a floor that is suitable for supporting an aircraft, the floor having a pit defined therein in a location that is generally intended to receive a nose end portion of an aircraft; and a nose wheel support system positioned in the pit, the support system including: a nose wheel support platform, the platform being sufficiently large to support a nose wheel assembly of an aircraft; vertical adjustment structure for raising and lowering the nose wheel support platform; horizontal adjustment structure for repositioning the nose wheel support platform within the pit, whereby the system may be adapted to support different models of commercial aircraft; sensing structure for sensing the horizontal position of the platform in the pit; and a controller, in communication with the sensing structure, for enabling and disabling the vertical adjustment structure in response to input from the sensing structure, whereby the platform may be vertically adjusted only at certain locations within the pit.

An adjustable facility for supporting a nose wheel assembly of a large aircraft during maintenance and repair, includes, according to a third aspect of the invention a hangar having a floor; an elongated pit defined in the floor, the pit having a width, a length and an opening where the pit intersects the floor; a support platform positioned over a portion of the opening; lift structure for raising and lowering the support platform; first powered structure in the pit for moving the support platform along the length of the pit; a plurality of spacer blocks positioned in the pit so as to cover portions of the opening that are not covered by support platform, the spacer blocks being movable along the length of the pit; and second structure in the pit for moving the spacer blocks along the length of the pit, whereby, when it is desired to move the support platform to conform the facility to a certain type of aircraft, the spacer blocks can likewise be moved to cover portions of the opening that are exposed by movement of the support platform.

A method of adjusting an aircraft docking facility, of the type that has a nose wheel support platform and a plurality of spacer blocks mounted in an elongated pit having an upper opening, to accommodate a certain model of aircraft, includes steps of, according to a fourth aspect of the invention: (a) selecting a portion of the opening in which to reposition the support platform; (b) lowering the support platform into the pit beneath the spacer blocks; (c) moving, without lifting, a selected number of spacer blocks to (i) cover a portion of the opening that is left vacated by the support platform; and (ii) create space for the platform at the selected portion of the opening; (d) moving the support platform into position beneath the selected portion of the opening; and (e) raising the support platform into the selected portion of the opening.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 2 is a side elevational view, partially in schematic, of a component of the system that is depicted in FIG. 1;

FIG. 3 is an end elevational view of the component that is depicted in FIG. 2;

DETAILED DESCRIPTION OF THE PREFERRED EMBODIMENT(S)

Figure 1:
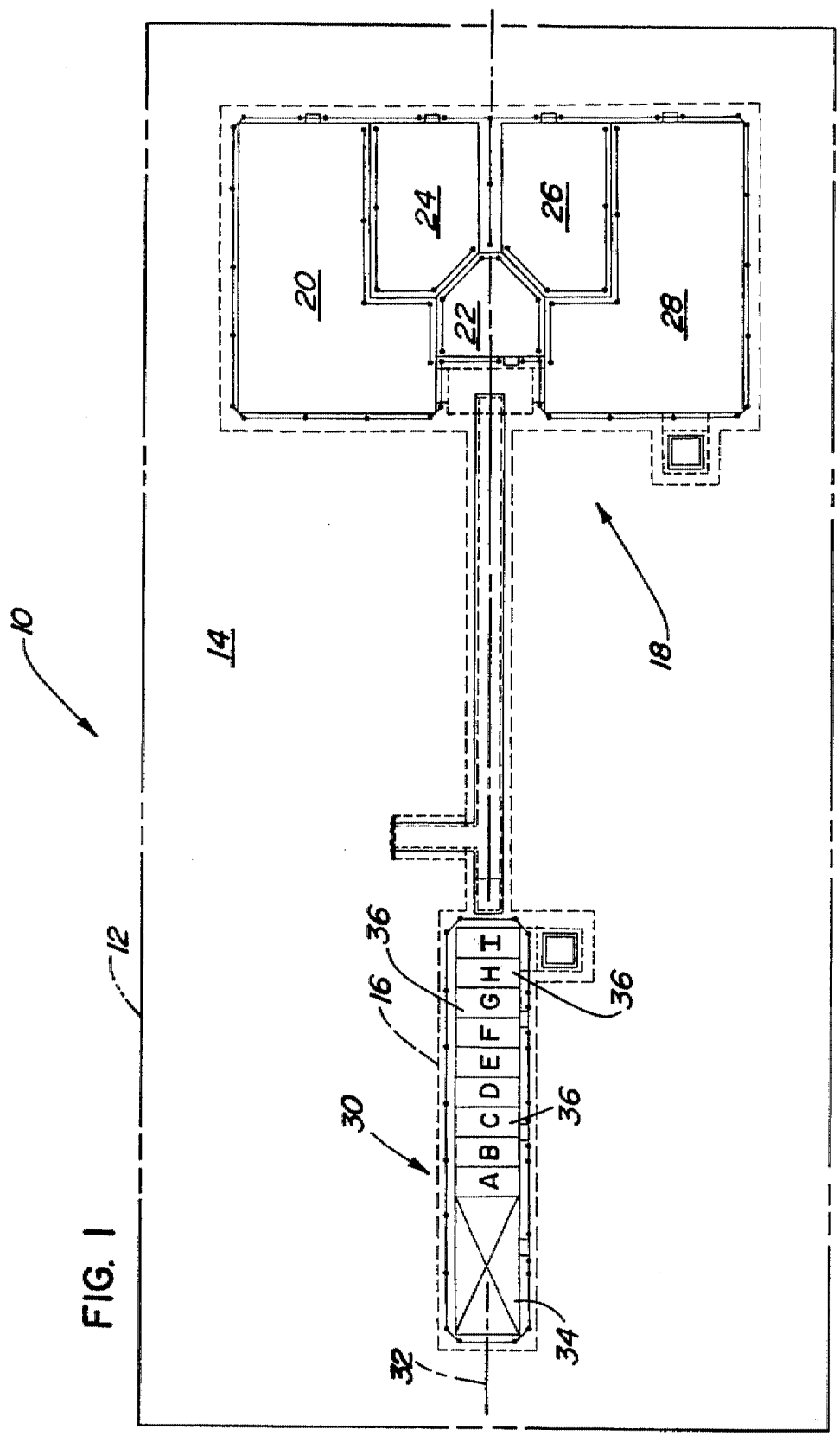
FIG. 1 is an overhead schematic diagram depicting an adjustable aircraft support system that is constructed according to a preferred embodiment of the invention.

Referring now to the drawings, wherein like reference numerals designate corresponding structures throughout the views, and referring in particular to FIG. 1, an improved facility 10 for preforming maintenance and repair on large aircraft such as a commercial jetliner includes a hangar 12, which is shown schematically in FIG. 1. Hangar 12 includes a floor 14 that is suitable for supporting an aircraft. Floor 14 has a pit defined therein in a location that is generally intended to receive a nose end portion of an aircraft. Facility 10 further includes a main landing gear support system 18 that incorporates a number of different lift platforms 20, 22, 24, 26, 28. Lift platforms 20, 22, 24, 26 and 28 are sized and configured to accommodate the landing gear assembly of a number of the most common models of large, commercial jetliners.

Facility 10 further includes a nose wheel support system 30 that is positioned in and about pit 16. As may be seen in FIG. 1, pit 16 is elongated along a longitudinal axis 32 that is coincident with an intended axial orientation of a fuselage of an aircraft that is positioned in hangar 12. Nose wheel support system 30 includes a nose wheel support platform 34, which is shaped appropriately and is sufficiently large to support a nose wheel assembly of an aircraft such as a commercial jetliner. As may be seen from FIGS. 1 and 3, pit 16 has a length, along longitudinal axis 32, a width and an opening where pit 16 intersects hangar floor 14. In FIG. 1 it may be seen that nose wheel support platform 34 covers a portion of that opening. A plurality of spacer blocks 36, individually labelled with letters A through I, are positioned versus pit 16 so as to cover portions of the opening that are not covered by nose wheel support platform 34. Spacer blocks 36 and their interaction with nose wheel support platform 34 will be discussed in greater detail below.

Referring now to FIG. 2, it will be seen that nose wheel support platform 34 is supported by a trolley assembly 38. As may be seen in FIGS. 2 and 3, trolley assembly 38 is supported by four wheels 40 that are adapted to ride upon a fixed track 42 in pit 16. In the preferred embodiment, fixed track 42 is constructed as a pair of rails which extend parallel to each other and to longitudinal axis 32. Accordingly, trolley assembly 38 is guided on fixed tracks 42 toward and away from the main landing gear support system 18. This permits facility 10 to accommodate different models of aircraft, which have different distances between their main landing gears and nose landing gear. Alternatively, trolley assembly 38 could be mounted for movement and driven by other means, such as by a low friction slide pad or non-rail mounted wheels.

As may be seen in FIG. 2, a hydraulic supply line 44 is connected to trolley assembly 38 from an external source, which will be described in greater detail below.

As is further shown in FIG. 2, trolley assembly 38 includes a hydraulic motor 46 that is coupled to reduction gearing 48, which in turn is connected to a drive sprocket 50. A chain 52 is secured at a first end of pit 16 to a fixed location 54 and at a second end to a second, opposite fixed location 56 of the pit 16. Fixed locations 54, 56 are preferably on the floor of pit 16, but could alternatively be positioned on a side wall or end wall thereof. Chain 52 is, as is shown in FIG. 2, engaged with drive sprocket 50 and with a pair of guide sprockets 58, 60. It will be apparent that when motor 46 turns in a first direction, drive sprocket 50 will gain traction on chain 52 and thus pull the entire trolley assembly 38 on fixed track 42 in a first longitudinal direction in pit 16. When motor 46 turns in a second, opposite direction, drive sprocket 50 will likewise turn in an opposite direction, and gain traction on chain 52 to pull the entire trolley assembly 38 in a second, opposite longitudinal direction. Alternatively, a pneumatic or electric motor could be used. The use of chain 56 for traction permits excellent traction, even if pit 16 becomes dirty and oily. However, other, more traditional types of drives could also be used.

Looking again to FIG. 2, it will be seen that trolley assembly 38 further includes a vertical adjustment mechanism 62 for raising and lowering the nose wheel support platform 34 with respect to hangar floor 14. Vertical adjustment mechanism 62 includes a hydraulic motor 64, a gear reducer 68, a drive shaft system 66 coupled in an H-drive arrangement via a pair of bevel reducers 71, and four screw jacks 70 that are mounted on columns on the trolley assembly 38. Screw jacks 70 are commercially available from Nook Industries, Inc. of Cleveland, Ohio as Model MSJ-U. When motor 64 turns in a first direction, the jack screws 70 likewise move in a first direction, and nose wheel support platform 34 is lifted with respect to the other portions of trolley assembly 38. When motor 64 turns in a second, opposite direction, nose wheel support platform 34 is lowered with respect to the other portion of trolley assembly 38.

Referring now to FIG. 3, the structure of each of the spacer blocks 36 will be described. Each spacer block 36 includes a top surface 72 that is flush with hangar floor 14. It will be seen that the side walls 74 of pit 16 have a pair of horizontal support surfaces on steel angle tracks 76, 78. As shown in FIG. 3, spacer block 36 includes a lower pedestal 80 that extends laterally outward to rest on the support surfaces. Bearing plates are mounted on the ends of pedestal 80 which bear against the vertical opposing surfaces of angle tracks 76, 78. The support surfaces, vertical and horizontal, of angle tracks 76, 78 thus form a slide on which spacer blocks 36 may slide longitudinally with respect to pit 16 and along its axis 32. Alternatively, other types of slide or roller bearings could be used.

A number of structural support members 82 are provided to support the top surface 72 of each spacer block 36 with respect to pedestal 80.

As may further be seen in FIG. 3, each spacer block 36 includes a cam bar 84 that depends downwardly from pedestal 80. The purpose of cam bar 84 will be discussed in greater detail below.

Referring again to FIG. 3, trolley assembly 38 has an inductive sensor 88 mounted to its frame adjacent to one wall 74 of pit 16. A number of metallic tabs 86 are secured to wall 74 at approximately the same vertical level as sensor 88. Metallic tabs 86 are spaced longitudinally on wall 74 at locations that correspond to certain selected positions of trolley assembly 38 where raising and lowering of nose wheel support platform 34 is permitted. The function of sensor 88 and the metallic tabs 86 will be described in greater detail below in the discussion of system operation.

Figure 5:
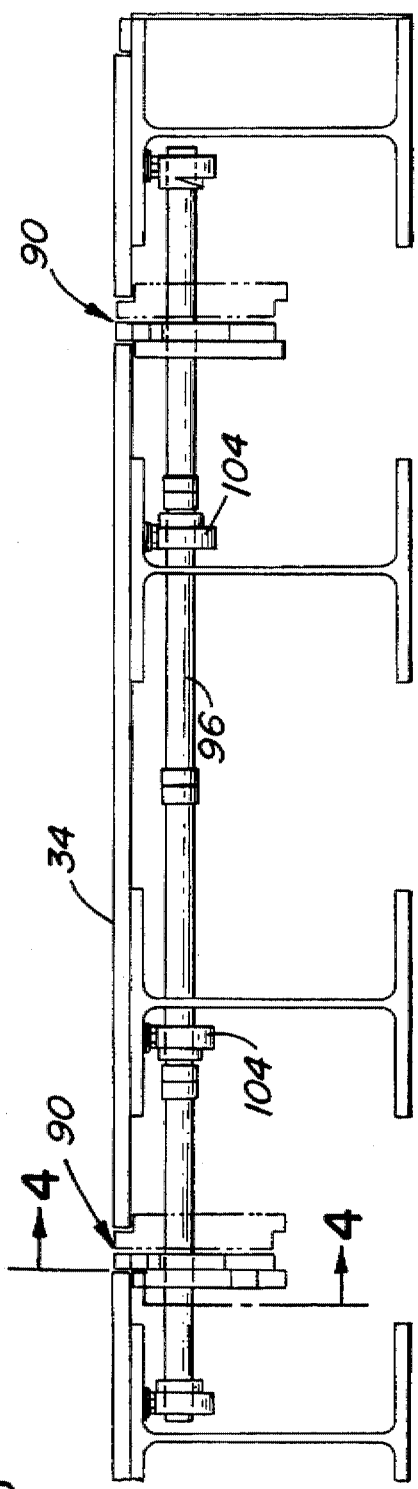
FIG. 5 is a fragmentary view of a portion of the component that is depicted in FIGS. 2 and 3.
Figure 4:
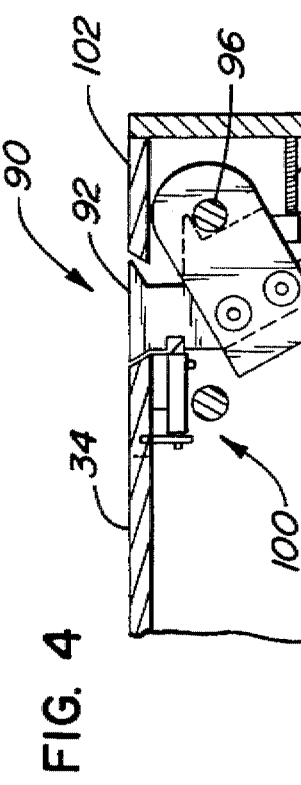
FIG. 4 is a fragmentary cross sectional view of a portion of the component that is depicted in FIGS. 2 and 3, taken along lines 4—4 in FIG. 5.
Figure 6:
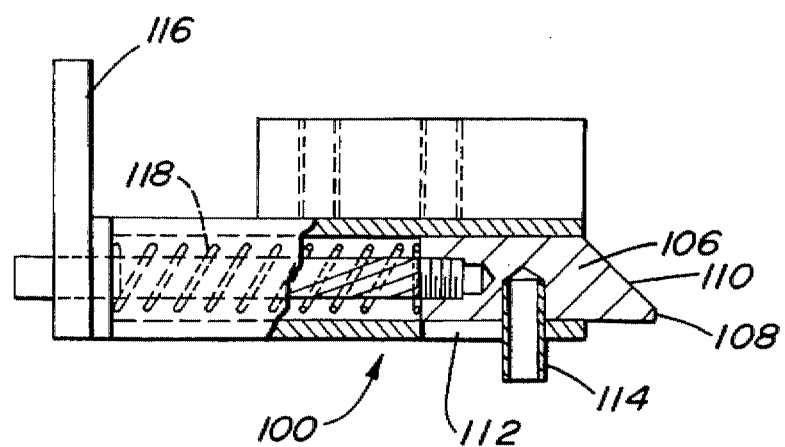
FIG. 6 is a fragmentary cross sectional view of a portion of the mechanism that is depicted in FIG. 4.

Referring now to FIGS. 4-6, it will be seen that nose wheel support system 30 further includes a spacer block engaging mechanism 90 at each end that is connected to trolley assembly 38 for engaging one or more spacer blocks 36, so that the trolley assembly 38 can be used to reposition spacer blocks 36 along the opening of pit 16 when facility 10 is to be reconfigured for another aircraft model. Referring first to FIG. 4, spacer block engaging mechanism 90 preferably includes a catch 92 that is positioned adjacent to one edge of a top surface 102 of nose wheel support platform 34. Catch 92 is mounted on a body 94, which in turn is mounted to rotate with a shaft 96 that is supported by bearing 104 on an underside of nose wheel support platform 34. A second, identical spacer block engaging mechanism 90 is spaced from the first engaging mechanism 90, and also pivots with the common shaft 96, as is best shown in FIG. 5. Looking again to FIG. 4, it will be seen that a compression spring 98 biases catch 92 to pivot in a clockwise direction, as viewed in FIG. 4. When catch 92 is in the position shown in FIG. 4, it is engaged by a latch 100 and, thus, will remain in the position shown in FIG. 4. However, when latch 100 is released, catch 92 will rotate in a clockwise direction to the position depicted in FIG. 9(a). In this position, catch 92 will positively engage a cam bar 84 of a spacer block 36 when platform 34 is moved to the left as viewed in FIG. 4. When platform 34 is moved to the right as viewed in FIG. 4, catch 92 will momentarily be depressed by the cam bar 84 of each spacer block 36, then released, in a ratchet type action. Preferably, each edge of platform 34 is also provided with a second engaging mechanism, identical in construction to engaging mechanism 90, that has a catch that is oriented in the opposite direction from catch 92. The shaft for the second engaging mechanism may be seen, in cross-section, beneath latch 100 in FIG. 4. Therefore, a ratchet-type action may be created between spacer blocks 36 and platform 34 in either direction. Latch 100 is shown in detail in FIG. 6. It includes a latch pin 106 having an end 108 with a cammed end surface 110, a guide pin 114 which is designed to travel within a guide slot 112, a lever 116, and a compression spring 118 for biasing latch pin 106 to the right as is viewed in FIG. 6. In operation, the travel of latch pin 106 is limited by the interaction of guide pin 114 and guide slot 112. The significance of spacer block engaging mechanism 90 will be discussed in an appropriate detail below. Alternatively, other types of catches could be used to engage spacer blocks 36, including a solenoid actuated catch that is controlled by a central controller.

Figure 7:
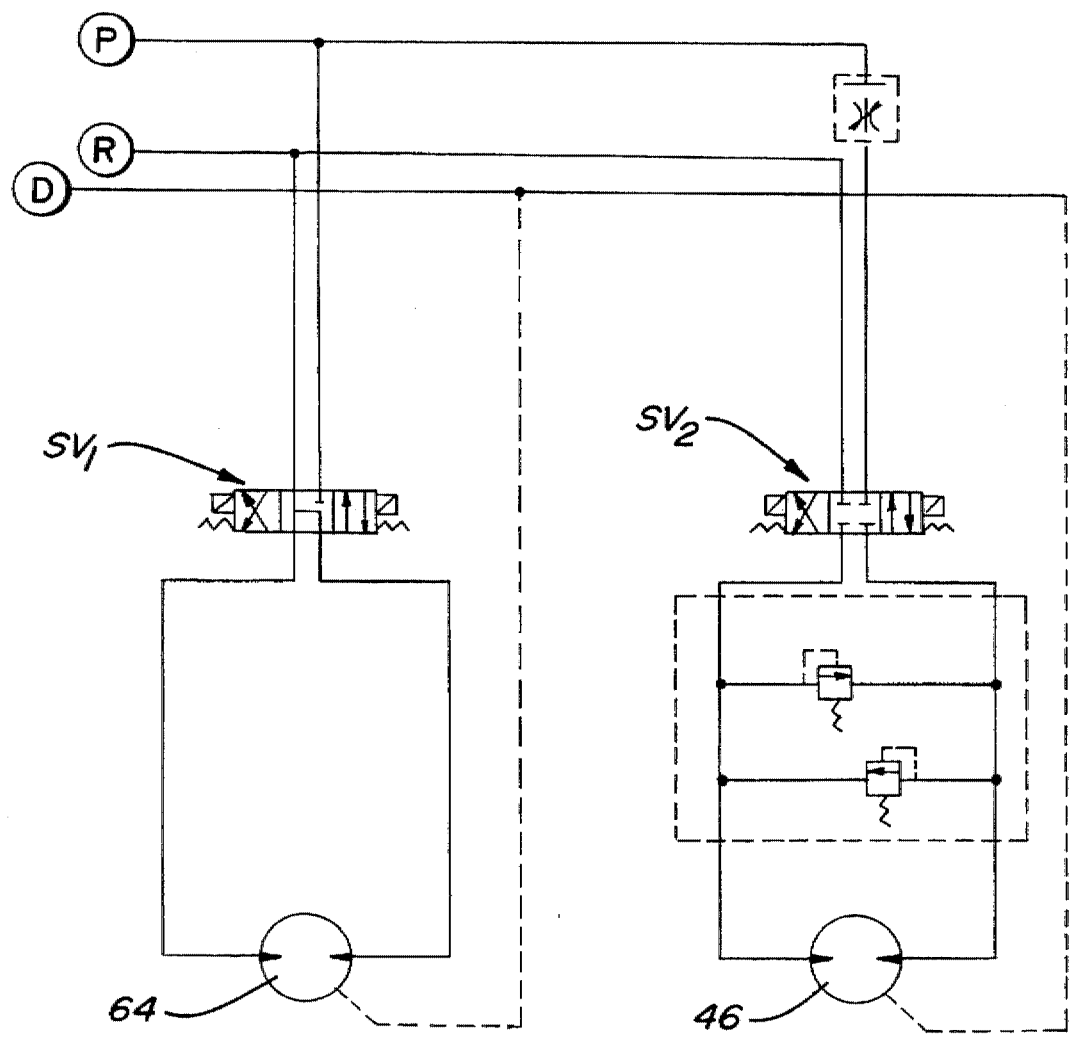
FIG. 7 is a schematic depiction of the hydraulic components of the system that is depicted in FIGS. 1–6.

The hydraulic control system for nose wheel support system 30 is depicted in FIG. 7. It will be seen that a first solenoid actuatable valve $SV_1$ controls the operation of motor 64 for the vertical adjustment mechanism 62. A second solenoid actuatable valve $SV_2$ controls the operation of trolley drive motor 46. Both valves $SV_1$ and $SV_2$ are three-position, four-way valves, which means that both motor 64 and motor 46 can be driven in a forward direction, a reverse direction, or not driven at all.

Figure 8:
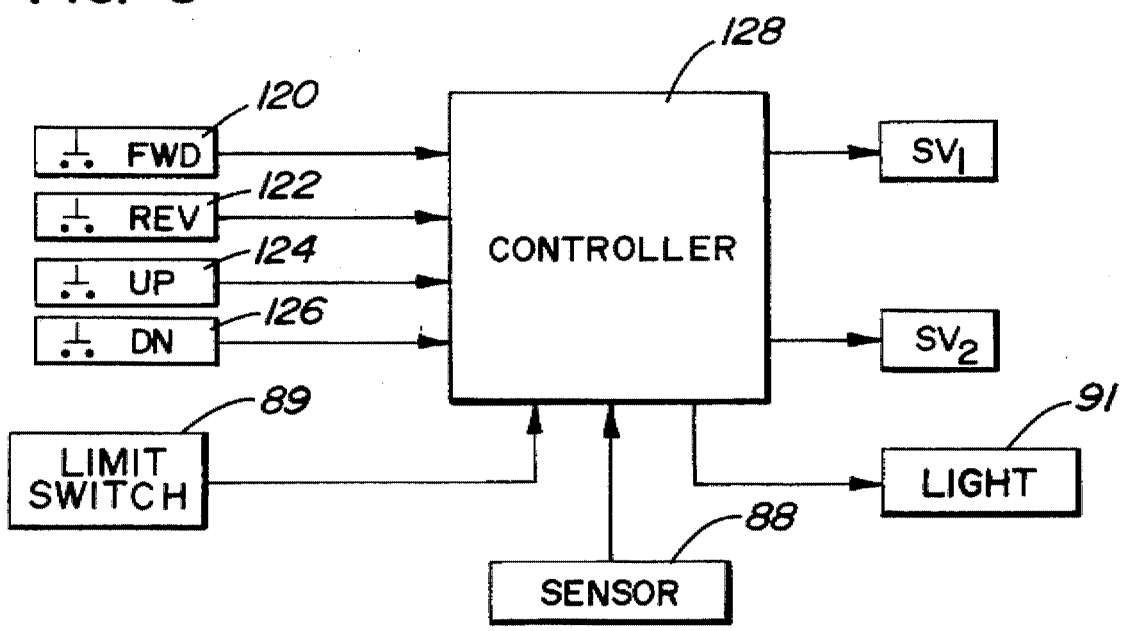
FIG. 8 is a schematic depiction of the electronic components of the system that is depicted in FIGS. 1–7.

The electronic control system for nose wheel support system 30 is schematically depicted in FIG. 8. It will be seen that the control system 30 includes buttons 120, 122, 124, 126 which permit an operator to instruct a controller 128 to, respectively, move the trolley assembly 38 forward on fixed track 42; move the trolley assembly 38 in a reverse direction on fixed track 42; move the nose wheel support platform 34 in an upward direction; and move the nose wheel support platform 34 in a downward direction. Buttons 120, 122, 124 and 126 are preferably mounted on a control pendant, which also has an indicator light 91 thereon. The control pendant is provided in a location near pit 16 where it is readily accessible to an operator. Controller 128 controls the operation of valves $SV_1$ and $SV_2$. Controller 128 further receives input from inductive sensor 88. Controller 128 is, in the preferred embodiment, a relay logic system, but could alternatively be constructed as a solid state logic control or other known system. Controller 128 further receives input from a vertical position limit switch 89.

Figure 9A:
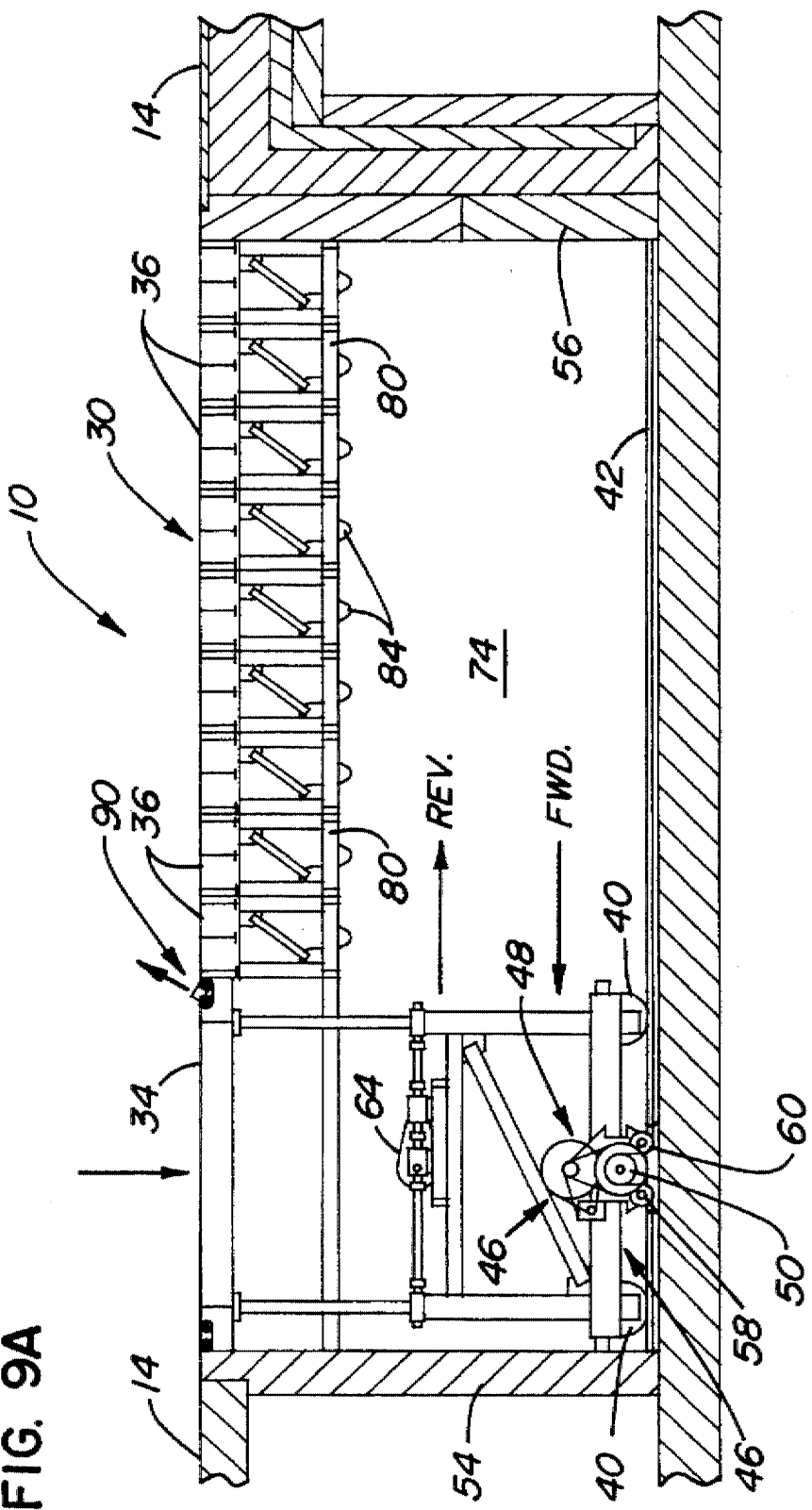
FIGS. 9(a)–9(f) constitute a diagrammatical depiction of how the system depicted FIGS. 1–8 operates.

The operation of a facility 10 according to the invention will now be discussed. FIG. 9(a) depicts the nose wheel support system 30 in a first orientation, which corresponds to that shown in FIG. 1. This position is for aircraft that require the maximum spacing permitted by facility 10 between the main landing gear assembly of the aircraft and the nose landing gear assembly. FIGS. 9(a)-9(f) depict how nose wheel support system 30 is adjusted to accommodate an aircraft that has a shorter main landing gear assembly to nose landing gear assembly spacing.

Referring to FIGS. 4, 6 and 9(a) an operator will first release the latch 100 of the spacer block engaging mechanism 90 on nose wheel support platform 34 by applying pressure to the lever 116, which retracts latch pin 106 and permits catch 92 to pivot in a clockwise direction under the influence of compression spring 98, as is viewed in FIG. 4. FIG. 9(a) depicts catch 92 in its open position.

Figure 9B:
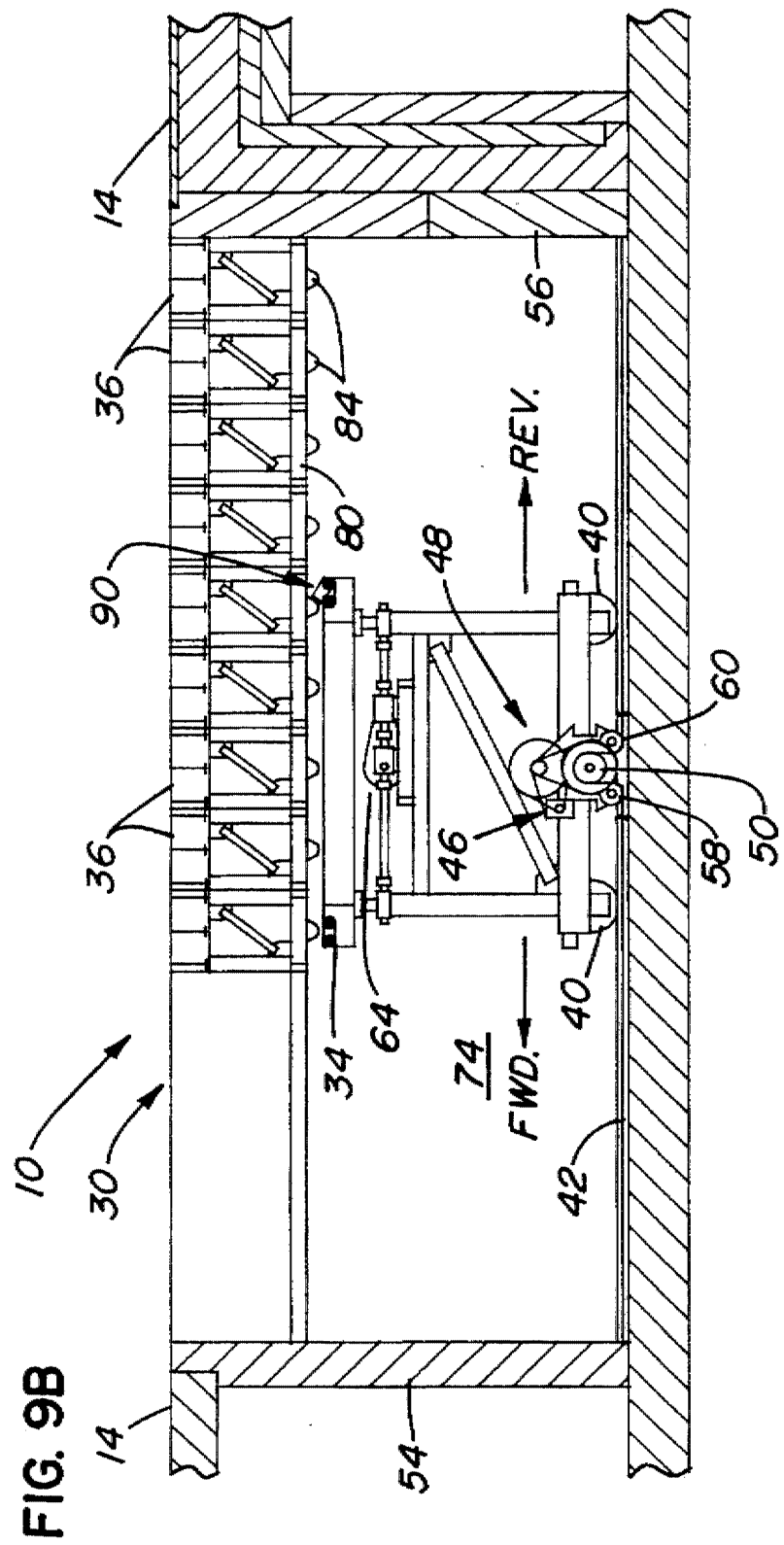

At this point, the operator will push the DOWN button 126, and controller 128 will actuate valve $SV_1$ to cause motor 64 to turn, thereby driving shaft system 66 and screw jacks 70 to lower the nose wheel support platform 34 to the position that is indicated in FIG. 9(b), at which point a limit switch 89 will be actuated, causing downward travel to stop and permitting horizontal travel of trolley assembly 38. However, controller 128 will not actuate valve $SV_1$ unless sensor 88 reports that trolley assembly 38 is properly positioned for vertical travel. Once this is complete, the operator will depress the REVERSE button 122, and controller 128 will instruct valve $SV_2$ to turn motor 46 in a first direction, which will turn the drive sprocket 50 via reduction gearing 48 to move the trolley assembly 38 as shown in FIG. 9(b) with respect to the traction chain 52. As trolley assembly 38 moves beneath the spacer blocks 36, as shown in FIG. 9(b), catch 92 of the spacer block engaging mechanism will first contact, then be depressed slightly, then released, in a ratchet type action, by the cam bar 84 that is positioned at the lowermost point of each spacer block 36. This creates a distinctive sound that the operator can rely upon to determine how many spacer blocks the engaging mechanism 90 has passed by. This is also determined by controller 128 based upon input from the sensor 88, which senses each time the sensor 88 passes by one of the metallic tabs 86. Controller 128 indicates the number of spacer blocks 36 that are passed by activating the light 91 that is provided on the pendant. Metallic tabs 86 are spaced regularly on wall 74 at increments that are equal to the spacing between adjacent spacer blocks 36, and that correspond to positions of the trolley assembly 38 where actuation of the vertical adjustment mechanism 62 is permitted. Alternatively, the metallic tabs 86 and sensor 88 could be coded to indicate the absolute position of trolley assembly 38 and support platform 34. This could be part of a completely automated system that could accomplish an entire reconfiguration of facility 10 without manual input.

Figure 9C:
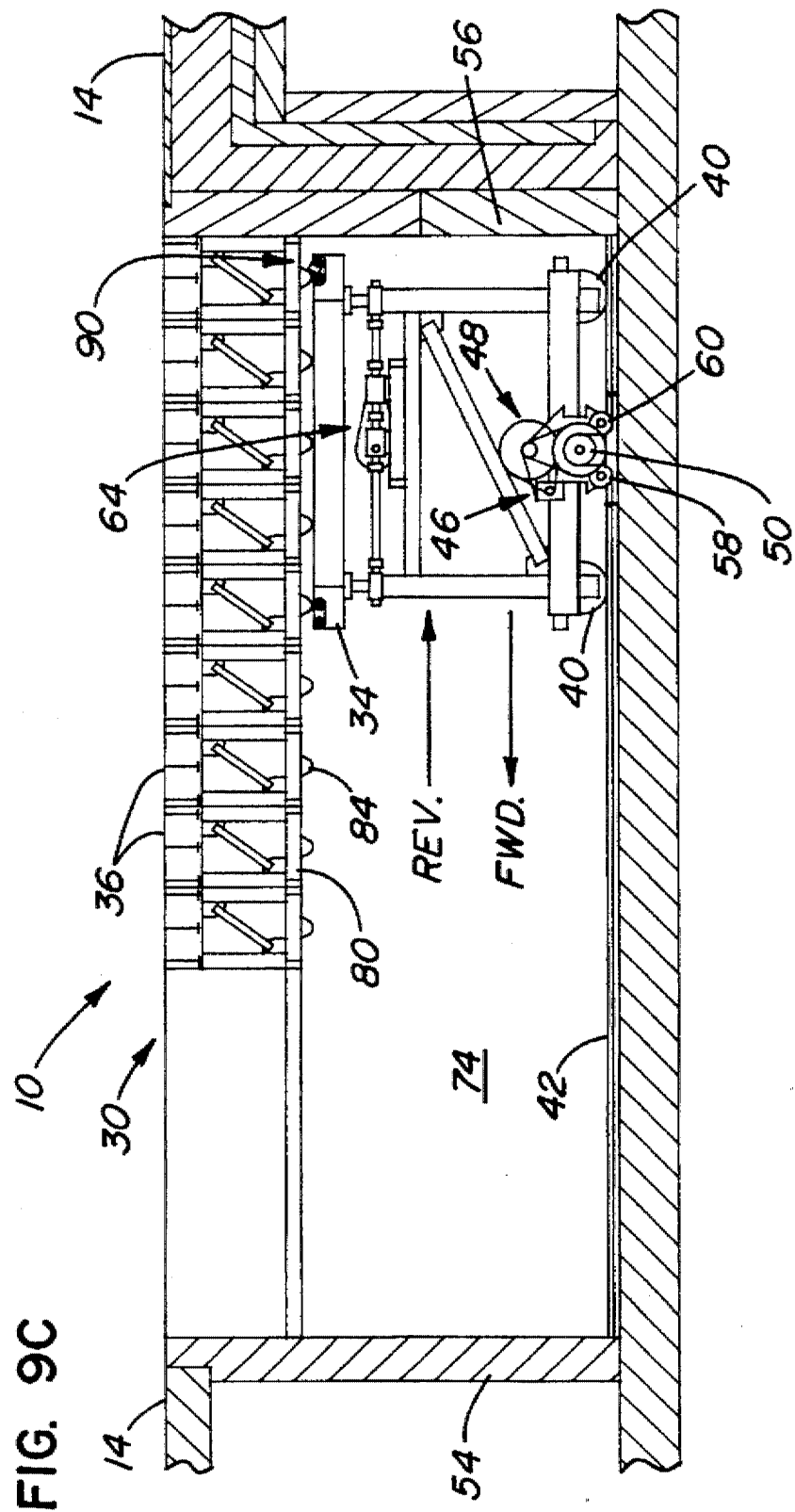
Figure 9D:
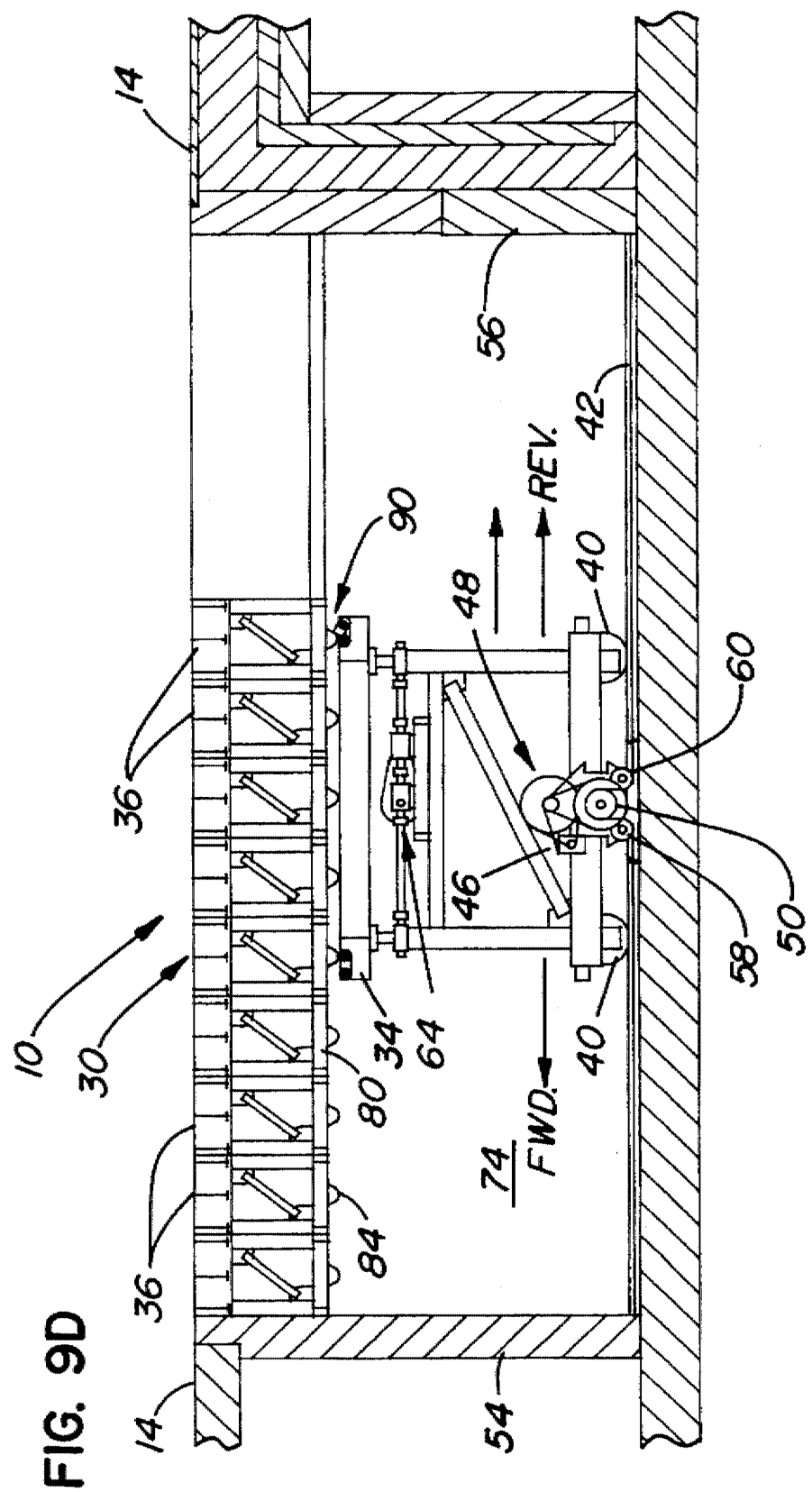
Figure 9E:
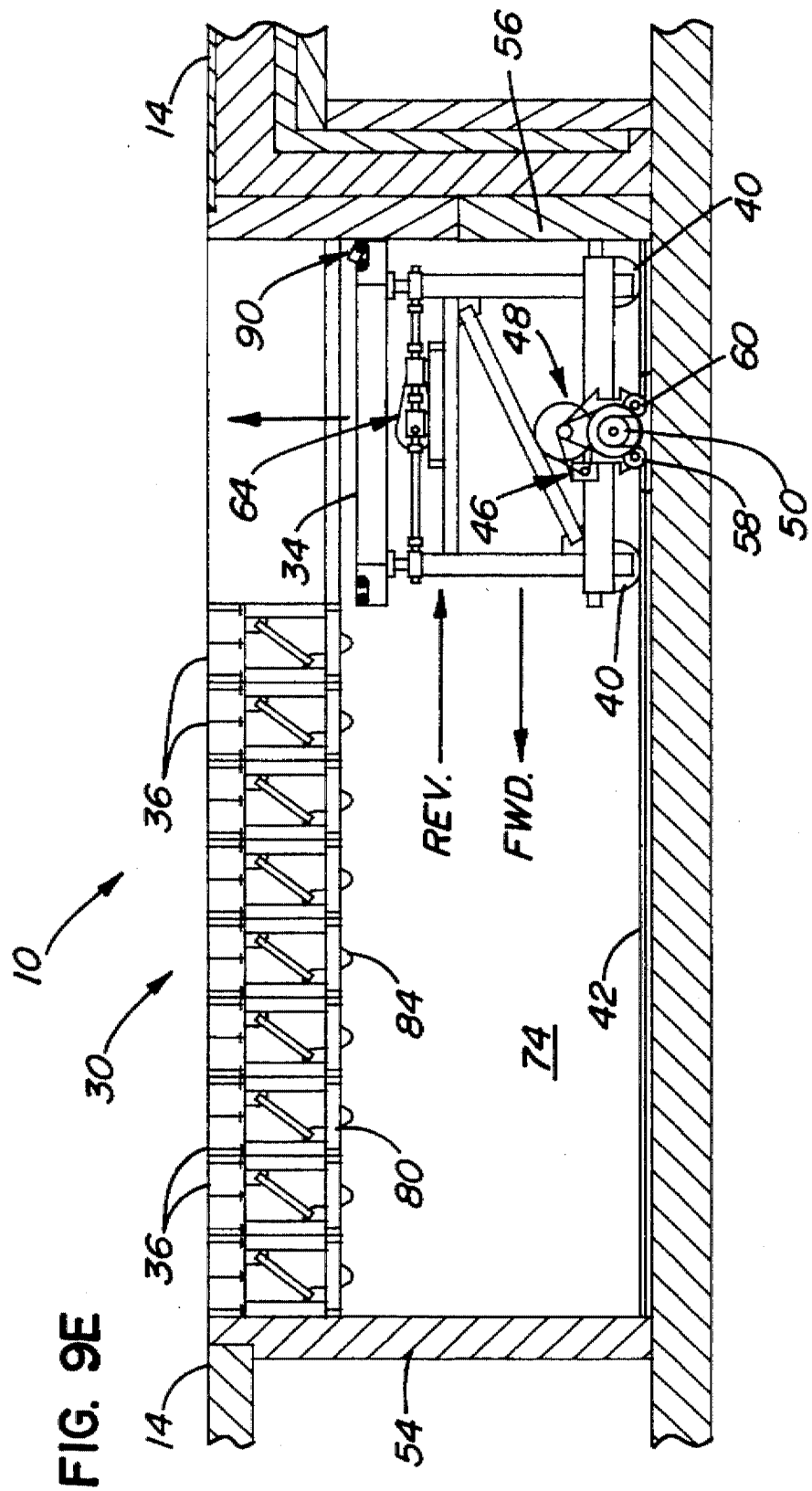

Once the engaging mechanism 90 has passed the cam bars 84 of the spacer blocks 36 that are to be repositioned, the operator will release the REVERSE button 122, and will depress the FORWARD button 120. This will cause controller 128 to actuate valve $SV_2$, and thus motor 46, reduction gearing 48 and drive sprocket 50 to gain traction upon chain 52 so as to drive trolley assembly 38 in the opposite direction that is depicted in FIG. 9(c). At this point, catch 92 will engage the cam bar 84 of the adjacent spacer block 36, and trolley assembly 38 will push the entire selected group of spacer blocks 36 to the left, as it is depicted FIG. 9(c). This motion continues until the spacer blocks have been slid to the opposite end of pit 16, as is shown in FIG. 9(d). At this point, the operator releases the FORWARD button 120, and again depresses the REVERSE button 122, closing the trolley assembly 38 to move beneath the nearly exposed open position, shown in FIG. 9(e). The operator will then release the REVERSE button 122, and will depress the UP button 124 to lift the nose wheel support platform 34 to the position indicated in the FIG. 9(f). Again, controller 128 will not permit vertical travel of platform 34 unless sensor 88 indicates that trolley assembly 38 is in a proper position.

Figure 9F:
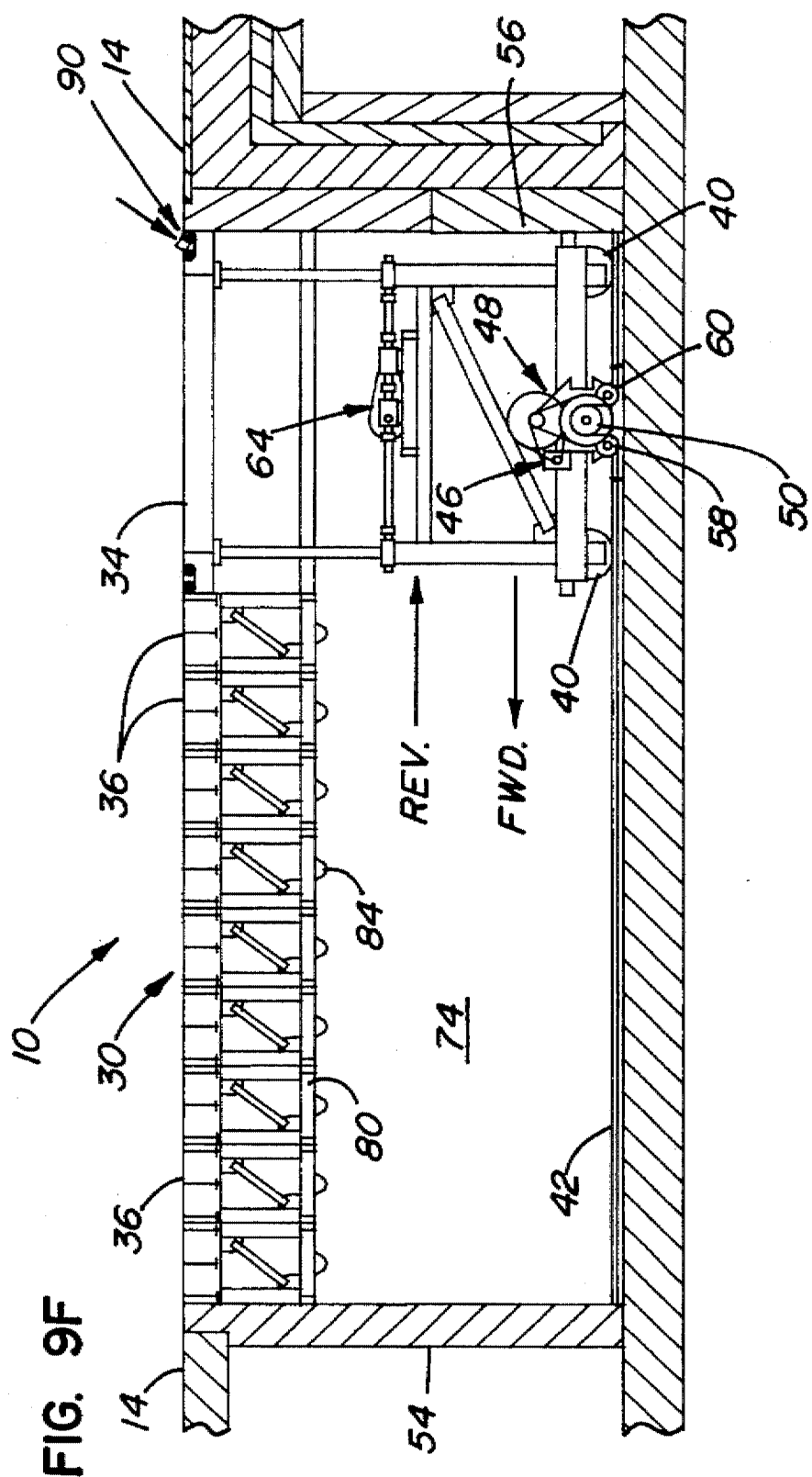

Once nose wheel support platform 34 is elevated to the position depicted in FIG. 9(f), the operator may simply apply pressure to the top surface of the catch 92, such as by stepping on it, to depress the catch 92 to the position depicted in FIG. 4, at which point the latch 100 will engage the catch 92 to hold it in the closed position.

It will be apparent that spacer blocks 36 and lift platform 38 can be arranged in any possible configuration by the repositioning process shown in FIGS. 9(a)–9(f). Of course, if it is desired to move one or more spacers in the direction that is opposite to that depicted in FIGS. 9(a)–9(f), the engaging mechanism 90 on the opposite side of lift platform 38 would be used to engage the spacer blocks 36.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed. For example, separate and independent drive mechanisms could be provided for moving the trolley mechanism 38 and the spacer blocks 36, respectively.

What is claimed is:

1. An adjustable facility for supporting a nose wheel assembly of a large aircraft during maintenance and repair, comprising:
   a hangar having a floor;
   an elongated pit defined in the floor, said pit having a width, a length and an opening where said pit intersects said floor;
   a trolley assembly positioned in said pit, said trolley assembly including means for moving said trolley assembly lengthwise within said pit, a support platform that is large enough to support a nose wheel assembly of a large aircraft and means for raising and lowering said support platform;
   a plurality of spacer blocks positioned versus said pit so as to cover portions of said opening that are not covered by said support platform, said spacer blocks being movable lengthwise of said pit; and
   engaging means connected to said trolley assembly for engaging at least one of said spacer block so that said trolley assembly is capable of positioning said spacer blocks along said opening when the position of said support platform is to be changed.

2. A facility according to claim 1, wherein said engaging means is positioned on said support platform.

3. A facility according to claim 1, wherein said engaging means comprises a latch that is mounted on said support platform.

4. A facility according to claim 3, further comprising means for permitting said spacer blocks to slide with respect to said pit.

5. A facility according to claim 1, wherein said means for raising and lowering said support platform is constructed so as to permit said support platform to be lowered beneath said spacer blocks so that said trolley is capable of travelling under said spacer blocks for the purpose of positioning said engaging means adjacent to a chosen one of said spacer blocks.

6. A facility according to claim 1, wherein said pit is elongated along an longitudinal axis that is coincident with an intended axial orientation of a fuselage of an aircraft in said hangar.

7. An adjustable facility for supporting a nose wheel assembly of a large aircraft during maintenance and repair, comprising:
   a hangar having a floor;
   an elongated pit defined in said floor, said pit having a width, a length and an opening where said pit intersects said floor;
   a support platform positioned over a portion of said opening;
   lift means for raising and lowering said support platform;
   first powered means in said pit for moving said support platform along the length of said pit said first powered means comprising a powered trolley;
   a plurality of spacer blocks positioned in said pit so as to cover portions of said opening that are not covered by said support platform, said spacer blocks being movable along the length of said pit; and
   second means in said pit for moving said spacer blocks along the length of said pit, said second means comprising an engaging means, connected to said trolley, for engaging one or more of said spacer blocks, so that said engaged spacer blocks will be slided lengthwise along said pit using motive power from said trolley, so that when it is desired to move said support platform to conform said facility to a certain type of aircraft, said spacer blocks will likewise be moved to cover portions of said opening that are exposed by movement of said support platform.

8. A method of adjusting an aircraft docking facility, of the type that has a nose wheel support platform and a plurality of spacer blocks mounted in an elongated pit having an upper opening, to accommodate a certain model of aircraft, comprising:

(a) selecting a portion of said opening in which to reposition said support platform;

(b) lowering said support platform into said pit beneath said spacer blocks;

(c) moving, without lifting, a selected number of spacer blocks to (i) cover a portion of the opening that is left vacated by said support platform; and (ii) create space for said platform at said selected portion of said opening;

(d) moving said support platform into position beneath said selected portion of said opening; and (e) raising said support platform into said selected portion of said opening.

9. A method according to claim 8, wherein step (c) comprises steps of: (i) moving said support platform beneath an end one of said selected spacer blocks; (ii) engaging said end spacer block with said support platform; and (iii) sliding said selected spacer blocks using motive power from said support platform.

* * * * *